United States Patent
Asano et al.

[11] Patent Number: 5,117,710
[45] Date of Patent: Jun. 2, 1992

[54] ELECTRONIC SHIFT CONTROL FOR AUTOMATIC TRANSMISSIONS

[75] Inventors: Hiroyuki Asano; Yuichi Abe, both of Kanagawa, Japan

[73] Assignee: Nissan Motor Co., Ltd., Yokohama, Japan

[21] Appl. No.: 645,657

[22] Filed: Jan. 25, 1991

[30] Foreign Application Priority Data

Jan. 25, 1990 [JP] Japan .................................. 2-13572

[51] Int. Cl.$^5$ ............................................ B60K 41/22
[52] U.S. Cl. ........................................ 74/861; 74/866; 74/878
[58] Field of Search .................... 74/878, 861, 866; 192/4 A

[56] References Cited

U.S. PATENT DOCUMENTS

| | | | |
|---|---|---|---|
| 4,583,171 | 4/1986 | Hara et al. | 74/861 X |
| 4,635,508 | 1/1987 | Tatsumi | 74/866 |
| 4,771,853 | 9/1988 | Nishikawa | 74/878 X |
| 4,849,899 | 7/1989 | Cote et al. | 74/866 X |
| 4,922,769 | 5/1990 | Tury | 74/866 |

FOREIGN PATENT DOCUMENTS 62-41954 3/1987 Japan .

Primary Examiner—Leslie A. Braun
Assistant Examiner—Ryan W. Massey
Attorney, Agent, or Firm—Foley & Lardner

[57] ABSTRACT

A shift control device of an automatic transmission causes the transmission to be forcedly shifted to a parking range or a neutral range when the shift ranges indicated by a shift instruction signal produced by a range selector and a current shift range signal produced by a detector are not coincident with each other. After such a forced shift, the shift control device tries to shift the transmission once again as formerly instructed by the range selector, and it is detected once again whether the shift ranges indicated by the current shift range signal and the shift instruction signal coincide with each other.

17 Claims, 6 Drawing Sheets

FIG.6

|   | P | R | N | D | 2 | 1 |
|---|---|---|---|---|---|---|
| P |   | $S_1$ | $S_2$ | $S_4$ | $S_7$ | $S_{11}$ |
| R | $S'_1$ |   | $S_3$ | $S_5$ | $S_8$ | $S_{12}$ |
| N | $S'_2$ | $S'_3$ |   | $S_6$ | $S_9$ | $S_{13}$ |
| D | $S'_4$ | $S'_5$ | $S'_6$ |   | $S_{10}$ | $S_{14}$ |
| 2 | $S'_7$ | $S'_8$ | $S'_9$ | $S'_{10}$ |   | $S_{15}$ |
| 1 | $S'_{11}$ | $S'_{12}$ | $S'_{13}$ | $S'_{14}$ | $S'_{15}$ |   |

ELECTRONIC SHIFT CONTROL FOR AUTOMATIC TRANSMISSIONS

BACKGROUND OF THE INVENTION

1. Field of the Invention

The present invention relates generally to the electronic shift control of automatic transmissions in accordance with signals determined by the actuation of a remote manually operable range selector lever and more particularly to the detection of an abnormal shift control in which the transmission is not shifted as instructed by the range selector lever.

2. Description of the Prior Art

An example of a prior art automatic transmission shift control device is shown in Japanese Utility Model Provisional Publication No. 62-41954. With the prior shift control device, an inhibitor switch detects the shift position of a manual lever of an automatic transmission and supplies a signal representative thereof to a shift controller for feedback shift control.

The prior art shift control device performes a shift control as shown in the flow chart of FIG. 5. That is, at step "S1" it is judged whether a shift instruction is made. When a shift insrtruction is actually made, the control proceeds to step "S2" where it is judged whether the shift instruction is proper in view of vehicle conditions such as a vehicle speed, an engine throttle opening, etc. When the shift instruction is proper in view of the vehicle conditions, the control proceeds to step "S3" where an actuation signal such as a drive pulse is supplied to a stepping motor or the like actuator. In this connection, the amount of drive by the actuator is determined depending upon the shift ranges between which a shift of the transmission is to be made. For example, the amounts and directions of drive steps are determined in accordance with the Table of FIG. 6 and stored in the shift controller. That is, where the transmission is to be shifted from the parking range "P" to the drive range "D", the actuator drives the manual lever of the transmission by S4 step in the normal direction. On the other hand, in the case that the transmission is to be shifted from the drive range "D" to the parking range "P", the actuator drives the manulal lever by S'4 step (i.e., by S4 step in the reverse direction). Then, at step "S4" it is judged whether it has passed a predeterminded time necessary for completing the shift. For example, in the case that the transmission is to be shifted from the parking range "P" to the drive range "D", it is judged at step "S4" whether it has passed a time necessary for completing the drive of the S4 step. After a predetermined time has passed, it is judged at step "S5" whether the current shift range indicated by the inhibitor switch is coincident with the shift range indicated by the shift instruction signal. In the case that the shift ranges indicated by the current shift range signal and the shift instruction signal are coincident with each other, the control is returned back to step "S1" to make ready for a next shift instruction by the driver. In the case that the shift ranges indicated by the current shift range signal and the shift instruction signal are not coincident with each other, the control proceeds to step "S10" where a buzzer is activated to inform the driver of the abnormal condition of the shift control device and at the same time the shift control device is stopped and disabled to make a further range shift.

In the prior art shift control device, whether the control device is in the normal condition is judged based upon whether the shift ranges indicated by the current shift range signal and the shift instruction signal are coincident with each other. Due to this, if the inhibitor switch happens to have a temporary contact defect and is thereby disabled to detect the current shift range properly, it is judged that the shift control device is in an abnormal condition and therefore the shift control device is stopped and disabled to make a further range shift. Accordingly, even if the inhibitor switch is defective only temporarily and therefore recovers its properly operable state soon after, the shift control device is held inoperable.

SUMMARY OF THE INVENTION

In accordance with the present invention, there is provided a novel and improved shift control device for an automatic transmission. The shift control device comprises a manually operable range selector for determining a selected shift range and producing a shift instruction signal representative of the selected shift range, control means for producing an actuation signal in response to the shift instruction signal, actuating means for actuating the automatic transmission to be shifted to the selected shift range in response to the actuation signal, detecting means for detecting a current shift range in which the automatic transmission is held after actuation by the actuating means in response to the actuation signal, and judging means for judging whether the selected shift range and the current shift range are coincident with each other. The control means causes the automatic transmission to be forcedly shifted to one of a parking range and a neutral range when the judging means judges that the selected shift range and the current shift range differ from each other.

The above structure is effective for solving the above noted problem inherent in the prior art device.

It is accordingly an object of the present invention to provide a novel and improved shift control device for an automatic transmission which can provide an assured and reliable shift control.

It is another object of the present invention to provide a novel and improved shift control device of the above described character which can assuredly prevent an erroneous detection of its abnormal condition.

It is a further object of the present invention to provide a novel and improved shift control device of the above described character which can assure the safe driving of an associated vehicle.

BRIEF DESCRIPTION OF THE DRAWINGS

FIG. 6 is a table of the relation between an amount of drive by an actuator and a resulting range shift.

DESCRIPTION OF THE PREFERRED EMBODIMENTS

Figure 1:
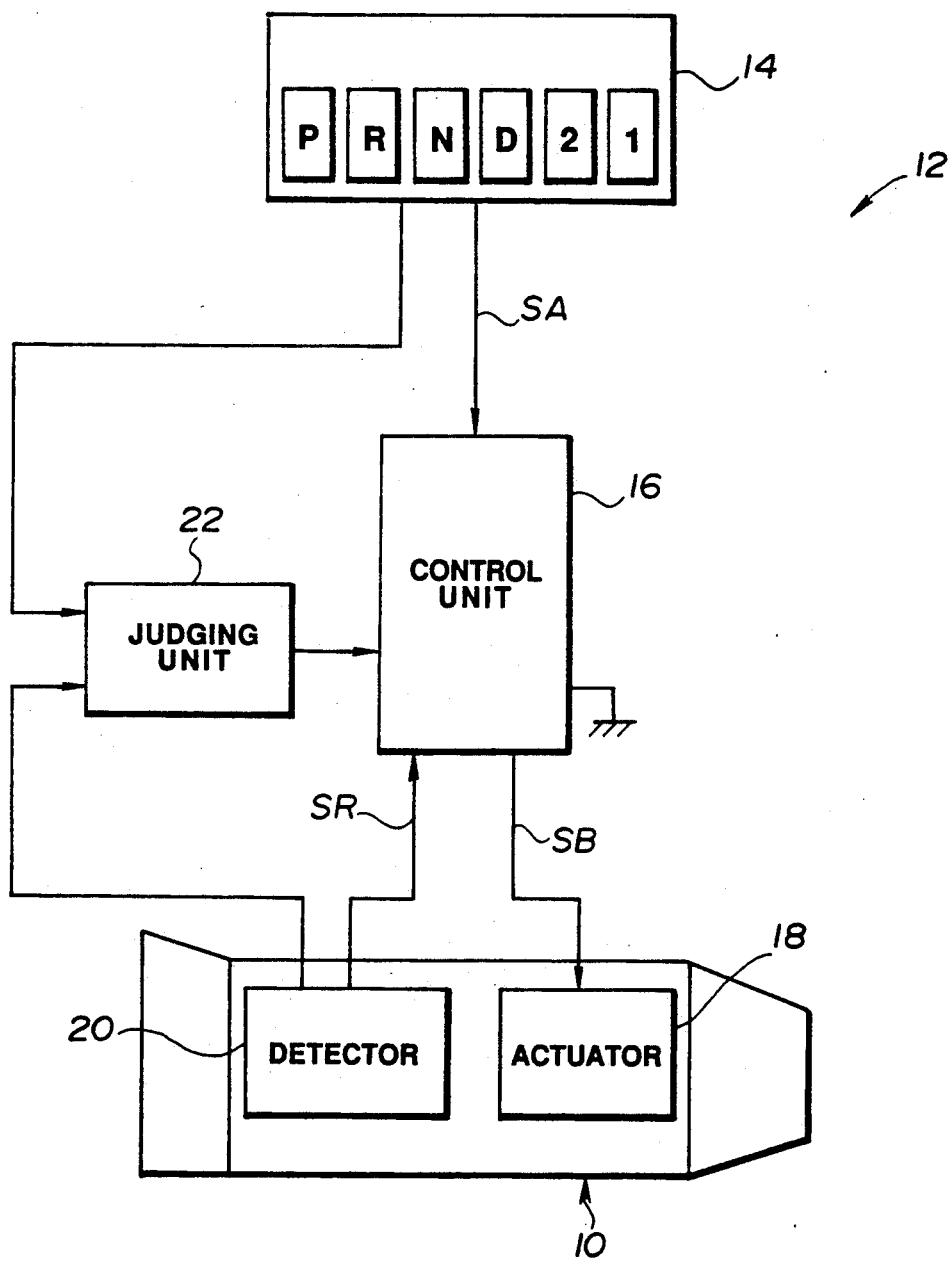
FIG. 1 is a schematic view of a shift control device of an automatic transmission according to an embodiment of the present invention.

Referring first to FIG. 1, an automatic transmission is generally indicated by 10 and shiftable into a plurality of shift ranges by the operation of a shift control device 12.

The shift control device 12 includes a remote manually operable range selector 14 which includes a manually operable range selector lever (not shown) and supplies a shift instruction signal "SA" to a control unit 16 which in turn supplies an actuation signal "SB" to an actuator 18. In response to this actuation signal "SB", the actuator 18 causes the transmission 10 to be shifted into a new shift range which is detected by a current shift range detecter 20. The current shift range detector 20 produces a current shift range signal "SR" representative of the current shift range and supplies it to the control unit 16. A judging unit 22 is provided for judging whether the shift ranges indicated by the current shift range signal "SR" and the shift instruction signal "SA" are coincident with each other. When the shift ranges indicated by the signals "SR" and "SA" are not coincident with each other, the control unit 16 causes the transmission 10 to be forcedly shifted into the parking range "P" or the neutral range "N".

After the transmission 10 is shifted to the parking range "P" or the neutral range "N", the range selector 14 supplies the same shift instruction signal "SA" to the control unit 16 which in turn supplies the same actuation signal "SB" to the actuator 18 for actuating it once again and makes the judging unit 22 judge once again whether the shift ranges indicated by the current shift range signal "SR" and the shift instruction signal "SA" are coincident with each other. When the shift ranges indicated by the signals "SR" and "SA" are coincident with each other, the shift control device 12 is kept operable and makes ready for a next shift instruction by the driver. On the other hand, when the shift ranges indicated by the signals "SR" and "SA" still differ from each other, the shift control device 12 is stopped and disabled to make a further range shift.

With the foregoing structure, in the case that the shift ranges indicated by the current shift range signal "SR" and the shift instruction signal "SA" are not coincident with each other after the operation of the actuator 18, the transmission 10 is forcedly shifted to the parking range "P" or the neutral range "N" to disable the vehicle to be driven further and therefore to run. After the transmission 10 is shifted to the parking range "P" or the neutral range "N", the range selector 14 produces the shift instruction signal "SA" once again for actuating the actuator 18 and thereby making the judging unit 22 judge once again whether the shift ranges indicated by the signals "SR" and "SA" are coincident with each other. By this, when the signals "SA" and "SR" now come to indicate the same shift range, the shift control device is held operable and makes ready for a next shift instruction by the driver.

Figure 2:
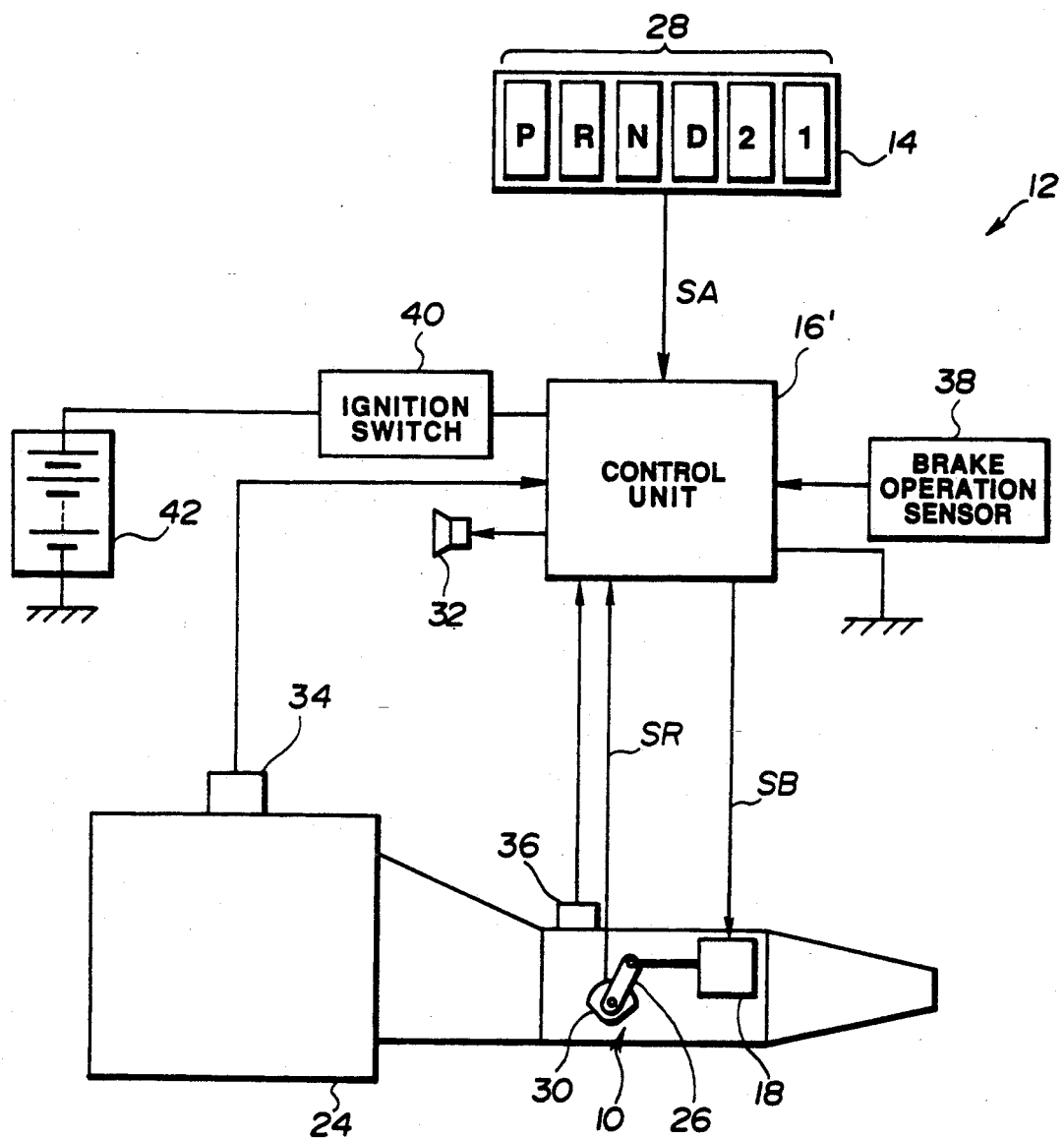
FIG. 2 is a view similar to FIG. 1 but shows a more specific embodiment of the present invention.

Referring to FIG. 2, the shift control device 12 will be described further on the basis of a more specific embodiment. In FIG. 2, like or corresponding parts or elements to those in the arrangement of FIG. 1 are designated by the same reference characters.

The automatic transmission 10 cooperates with an internal combustion engine 24 to constitute a drive assembly. The transmission 10 is shiftable into a plurality of shift ranges by turning a manual lever 26 of the transmission 10 into corresponding angular positions or shift positions.

To actuate the manual lever 26, the range selector 14 is provided which includes a plurality of selector switches 28 operable to produce electrical singals representative of respective shift ranges such as a parking range "P", reverse range "R", neutral range "N", drive range "D", 2nd gear range "2", 1st gear range "1", etc. By selectively operating the switches 28 through the operation of a manual selector lever (not shown), the range selector 14 produces a shift instruction signal "SA" representative of a selected shift range.

The shift instruction signal "SA" is supplied to the control unit 16' which is, by way of example, constituted by a microcomputer having a function serving as a judging unit for judging whether the transmission 10 is shifted as instructed by the range selector 14.

The control unit 16' receives a shift instruction signal "SA" from the range selector 14 and supplies an actuation signal "SB" to the actuator 18 such as a stepping motor. The actuator 18 drives the manual lever 26 into a selected shift position in response to the actuation signal "SB".

To detect the shift position of the manual lever 26, an inhibitor switch 30 is provided. The inhibitor switch 30 is thus operable to serve as a current shift range detector and supplies a current shift range signal "SR" to the control unit 16'. In this connection, in the case that the shift ranges indicated by the current shift range signal "SR" and the shift instruction singal "SA" differ from each other, the control unit 16' judges that the shift control device 12 is in an abnormal condition and produces an abnormal condition indicating signal for stopping the device. The abnormal condition indicating signal is also supplied to a buzzer 32 to activate it for thereby informing the driver of the abnormal condition of the shift control device 12.

The manual lever 26 of the transmission 10 is driven by means of the actuator 18, and its amount of drive is determined depending upon the shift ranges between which a range shift of the transmission 10 is to be made, which amount of drive is shown in Table of FIG. 6 and stored in the shift controller 16'.

The control unit 16' is also supplied with signals from a throttle opening sensor 34 of the engine 24, a vehicle speed sensor 36, a brake operation sensor 38, etc. for making a shift control based thereon. Further, an ignition switch 40 of the engine 24 is adapted to serve as an electric source switch of the shift control device 12 such that when an engine key (not shown) is operated to put an ignition circuit (also not shown) into an ON condition an electrical current is supplied from a battery 42 to the control unit 16'.

Figure 3:
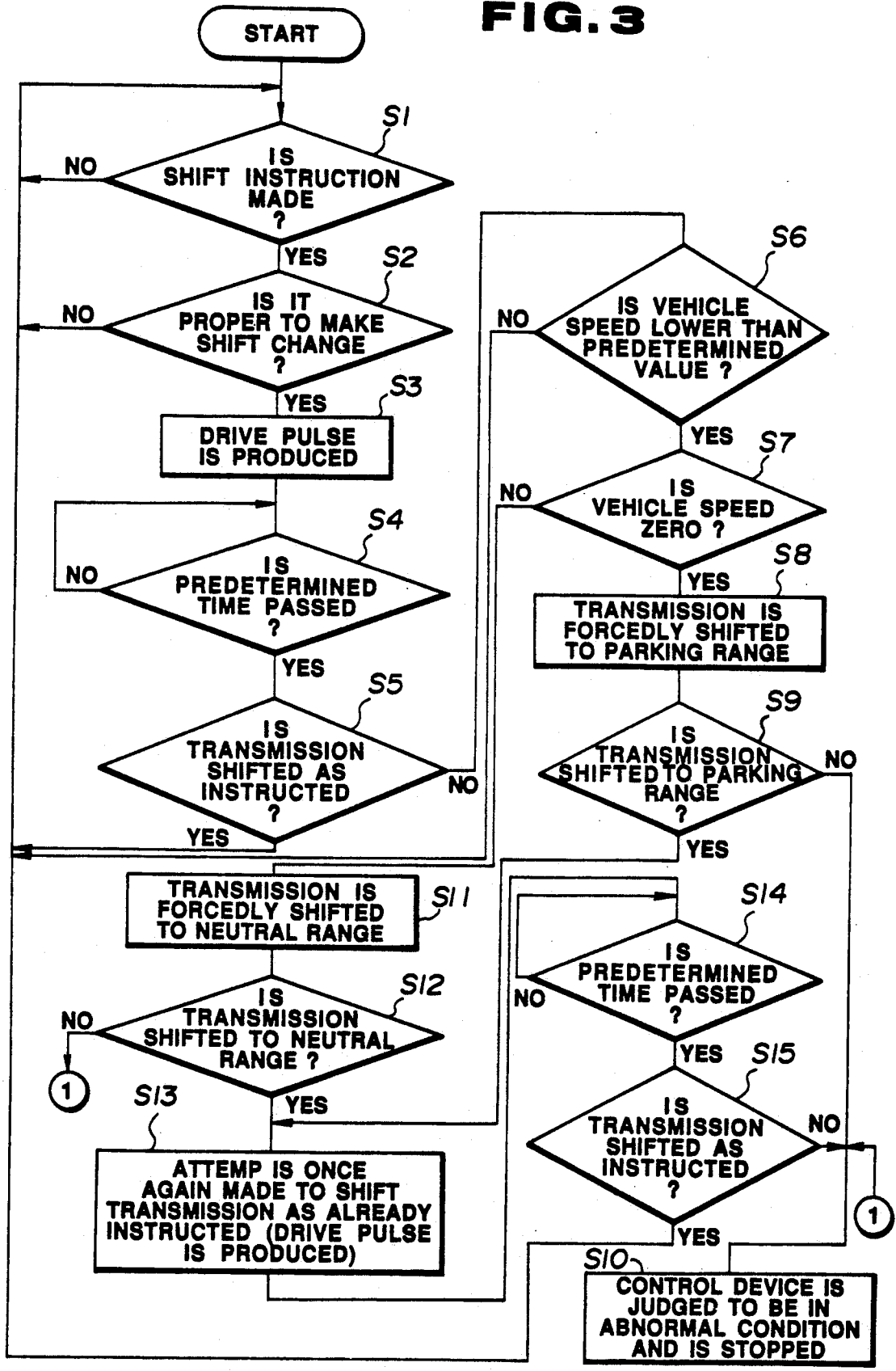
FIG. 3 is a flow chart of a shift control according to the embodiments of FIGS. 1 and 2.
Figure 5:
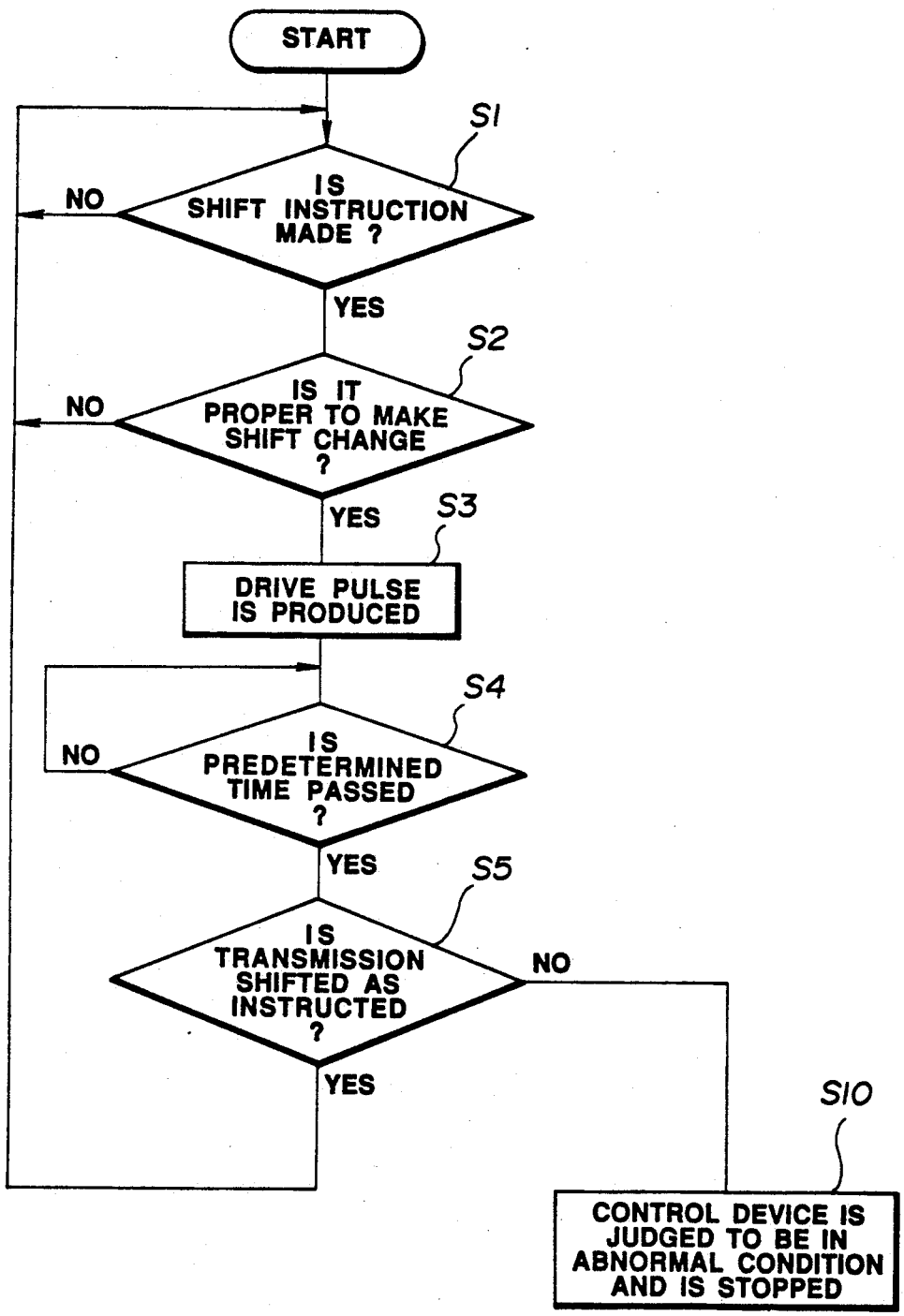
FIG. 5 is a flow chart of a shift control according to a art.

The operation of the shift control device 12 of this invention will be described hereinafter with reference to the flow chart of FIG. 3 in which the same steps as those of the prior art flow chart of FIG. 5 are designated by the same reference characters and repeated description thereto is omitted for brevity.

At step "S5", it is judged whether the shift range indicated by the current shift range signal "SR" is coincident with the shift range indicated by the shift instruction signal "SA". When the shift ranges indicated by the signals "SR" and "SA" are not coincident with each other, the control proceeds to step "S6" where it is judged whether the vehicle speed detected by the sensor 36 is equal to or lower than a predetermined value such as 5 km/h. When the vehicle speed is equal to or lower than a predetermined value, the control proceeds to step "S7" where it is judged whether the vehicle speed is zero. When the vehicle speed is zero, i.e., the vehicle is making a stop, the control proceeds to step "S8" where the transmission 10 is forcedly shifted to the parking range "P".

At step "S9", it is judged whether the signal "SR" produced by the inhibitor switch 30 indicates that the transmission 10 has been shifted to the parking range "P". When the transmission 12 has not yet been shifted to the parking range "P", the control proceeds to step "10" where the shift control device 12 is judged to be in an abnormal condition and thus stopped and disabled to make a further range shift and at the same time the buzzer 32 is activated to inform the driver of the abnormal condition of the shift control device 12.

When it is judged at step "S7" that the vehicle speed is not zero and therefore the vehicle is running at the speed equal to or lower than 5 km/h, the control proceeds to step "S11" where the transmission 10 is forcedly shifted to the neutral range "N". In this instance, the brake may be automatically and forcedly applied to stop the vehicle. At step "S12", it is judged on the basis of the signal "SR" whether the transmission 10 is in the neutral range "N". In this instance, when the transmission 10 is not in the neutral range "N", the control proceeds to step "S10" to stop the shift control device 12 similarly as described above.

On the other hand, when it is judged at step "S9", on the basis of the signal "SR", that the transmission 10 has been shifted to the parking range "P", or at step "S12" that the transmission 10 has been shifted to the neutral range "N", the control proceeds to step "S13" to make a shift instruction similar to that made at step "S1". For example, in the case that an instruction for shifting the transmission 10 to the drive range "D" had been made at step "S1", the same signal for making the same shift is produced once again at step "S13". The control unit 16' receives the shift instruction signal "SA" and produces the actuation signal "SB". In response to the actuation signal "SB", the manual lever 26 is driven into the drive position "D". The number of drive step (i.e., amount of drive) of the actuator 18 for that drive is read from Table of FIG. 6. For example, in the case that the manual lever 26 is to be driven from the parking position "P" to the drive position "D" it is driven by the actuator 18 by S4 step. In the case that the manual lever 26 is to be driven from the neutral position "N" to the drive position "D" it is driven by the actuator 18 by S6 step.

Then, it is judged at step "S14" whether it has passed a predetermined time necessary for completing the range shift. After a predetermined time has passed, it is judged at step "S15" whether the shift ranges indicated by the signals "SR" and "SA" are coincident with each other. When the shift ranges indicated by the signals "SR" and "SA" differ from each other, the control proceeds to step "S10" where it is judged that the shift control device 12 is in an abormal condition, and the buzzer 32 is activated to inform the driver of the abnormal condition of the shift control device 12 while at the same time the shift control device 12 is stopped and disabled to make a further range shift. Further, when it is judged at step "S15" that the shift ranges indicated by the signals "SA" and "SR" are coincident with each other, the control is returned back to step "S1" to make ready for a next shift instruction by the driver.

In this manner, the transmission 10 is forcedly shifted to the neutral range "N" or parking range "P" to make a detection of a shift control once again when it is once judged that the shift ranges indicated by the current shift range signal "SR" and the shift instruction singal "SA" are not coincident with each other, whereby it becomes possible to prevent the shift control device 12 from being stopped due to a temporary contact defect of the inhibitor switch 30 or the like.

Thus, in the case that the shift ranges indicated by the signals "SR" and "SA" come to be coincident with each other for the first time in response to the same shift instruction made for the second time, it is judged that the shift control device 12 is in the normal condition and capable of making a normal shift control by means of the inhibitor switch 30. Accordingly, it becomes possible to prevent the shift control device 12 from performing an erroneous judgment when the inhibitor stitch 30 is only temporarily put into a defective contact condition.

Figure 4:
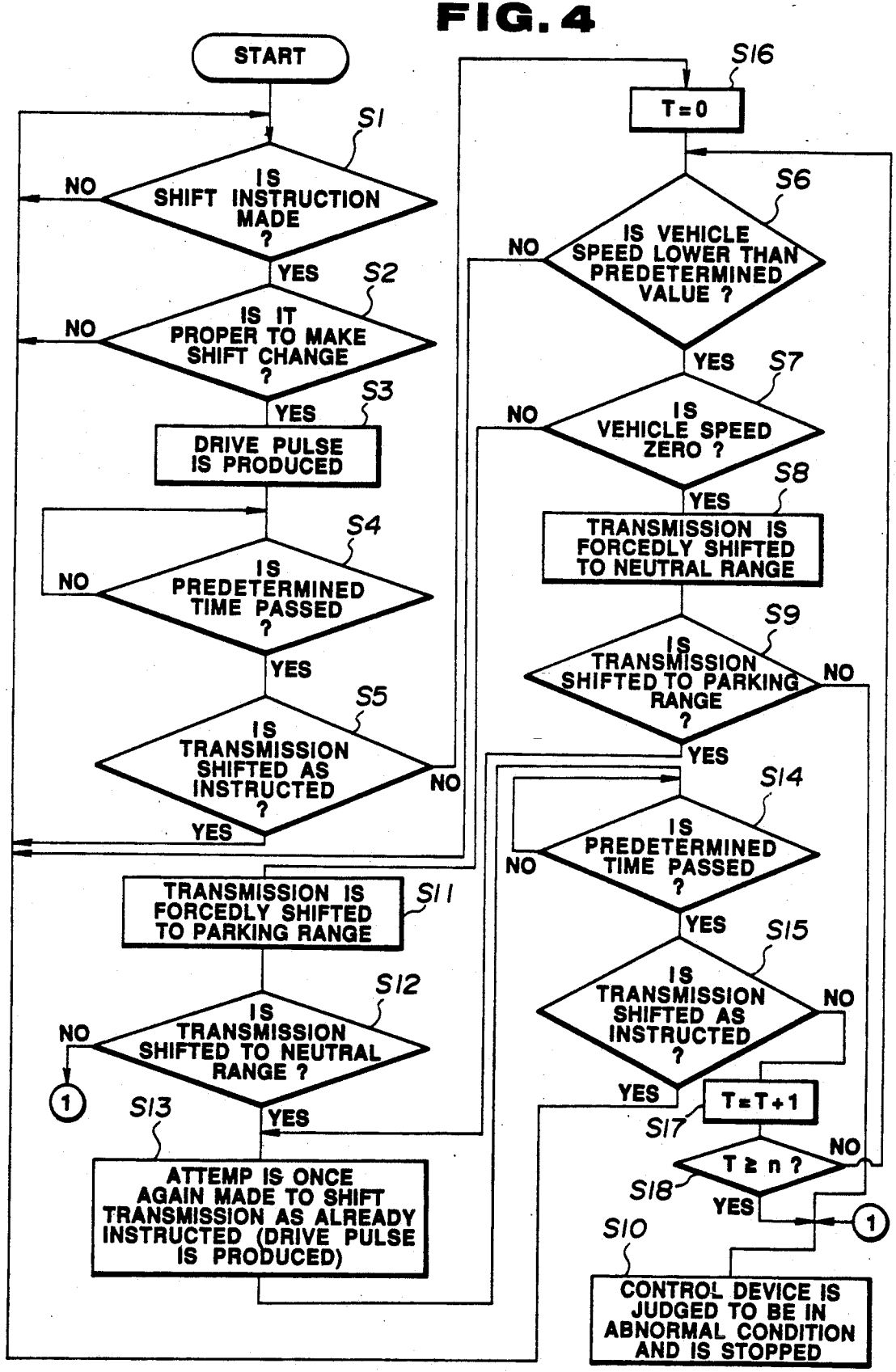
FIG. 4 is a flow chart of a shift control according to another embodiment of the present invention.

Referring to FIG. 4, a shift control according to another embodiment of this invention will be descibed. In the flow chart of FIG. 4, the similar steps to those of the previous embodiment are designated by the same reference characters and repeated description thereto are omitted for brevity.

In this shift control, after the transmission 10 is forcedly shifted to the parking position "P" or the neutral position "N" in response to the judgement that the shift ranges indicated by the shift instruction signal "SA" and the current shift range signal "SR" are different from each other, the same shift instruction is repeated predetermined times before the shift control device 12 is judged to be in an abnormal condition.

That is, in the case that it is judged at step "S5" that the shift ranges indicated by the current shift range signal "SR" and the shift instruction signal "SA" are different from each other, the control proceeds to step "S16" to set the number of times the shift instruction is made to zero. Then, the shift control is made in the accordance with steps "S7" to "S9" and "S11" to "S15". In this instance, in case that it is judged at step "S15" that the shift ranges indicated by the current shift range signal "SR" and the shift instruction signal "SA" differ from each other, the control proceeds to step "S17" where the number of times the shift instruction has been repeated is increased by one, and it is judged at step "S18" whether the shift instruction has been repeated predetermined times "n". When the shift instruction has not yet been repeated predetermined times "n", the control is returned to step "S7" to repeat a shift instruction further. When the shift instruction has been repeated predetermined times "n" and the shift ranges indicated by the signals "SR" and "SA" still differ from each other, the control proceeds to step "S10" where it is judged that the shift control device 12 is in an abnormal condition, and therefore the shift control device 12 is stopped and disabled to make a further range shift while at the same time the buzzer 32 is activated to inform the driver of the abnormal condition of the shift control device 12.

With this embodiment, the shift instructions are repeated predetermined times to prevent more assuredly the erroneous detection of an abnormal condition of the shift control device 12 due to a temporary contact defect of the inhibitor switch 30 or the like.

What is claimed is:

1. A shift control device for an automatic transmission, comprising:
   a manually operable range selector for determining a selected shift range and producing a shift instruction signal representative of said selected shift range;
   control means for producing an actuation signal in response to said shift instruction signal;
   actuating means for actuating the automatic transmission to be shifted to said selected shift range in response to said actuation signal;
   detecting means for detecting a current shift range in which the automatic transmission is held after actuation by said actuating means in response to said actuation signal; and
   judging means for judging whether said selected shift range and said current shift range are coincident with each other;
   when said judging means judges that said selected shift range and said current shift range differ from each other, and when an associated vehicle speed is lower than a predetermined value, said control means causing the automatic transmission to be forcedly shifted to one of a parking range and a neutral range which is determined dependent upon the associated vehicle speed.

2. A shift control device according to claim 1, wherein after the automatic transmission has been shifted to one of the parking range and the neutral range, said control means supplies once again the same actuation signal to said actuating means.

3. A shift control device according to claim 2, wherein when said judging means comes to judge, after supply of said actuation signal to said actuating means for the second time, that said selected shift range and said current shift range are coincident with each other, said control means makes ready for a next shift instruction.

4. A shift control device according to claim 1, wherein said control means causes the automatic transmission to be forcedly shifted to the parking range when said judging means judges that said selected shift range and said current shift range differ from each other and when the associated vehicle is making a stop.

5. A shift control device according to claim 4, wherein said control means judges that the shift control device is in an abnormal condition when incapable of causing the automatic transmission to be forcedly shifted to the parking range.

6. A shift control device according to claim 5, wherein said control means causes the automatic transmission to be forcedly shifted to the neutral range when said judging means judges that selected shift range and said current shift range differ from each other and when the associated vehicle is running at speed equal to or lower than a predetermined value.

7. A shift control device according to claim 6, wherein said control means judges that the shift control device is in an abnormal condition when incapable of causing the automatic transmission to be forcedly shifted to the neutral range.

8. A shift control device according to claim 7, wherein said control means supplies the same actuation signal to said actuating means plural times until said judging means judges that said selected shift range and said current shift range are coincident with each other.

9. A shift control device according to claim 1, wherein said detecting means comprises an inhibitor switch for detecting a shift position of a manual lever of the automatic transmission.

10. A shift control device according to claim 1, wherein said actuating means comprises a stepping motor.

11. A shift control device for an automatic transmission, comprising:
    a manually operable range selector for determining a selected shift range and producing a shift instruction signal representative of said select shift range;
    control means for producing an actuation signal in response to said shift instruction signal;
    actuating means for actuating the automatic transmission to be shifted to said selected shift range in response to said actuation signal;
    detecting means for detecting a current shift range in which the automatic transmission is held after actuation by said actuating means in response to said actuation signal; and
    judging means for judging whether said selected shift range and said current shift range are coincident with each other;
    said control means causing the automatic transmission to be forcedly shifted to one of a parking range and a neutral range when said judging means judges that said selected shift range and said current shift range differ from each other; and
    wherein after the automatic transmission has been shifted to one of the parking range and the neutral range, said control means supplies once again the same actuation signal to said actuating means.

12. A shift control device according to claim 11, wherein said judging means judges, after supply of said actuation signal to said actuating means for the second time, that said selected shift range and said current shift range are coincident with each other, said control means makes ready for a next shift instruction.

13. A shift control device according to claim 12, wherein said control means causes the automatic transmission to be forcedly shifted to the parking range when said judging means judges that said selected shift range and said current shift range differ from each other and when an associated vehicle is making a stop.

14. A shift control device according to claim 13, wherein said control means judges that the shift control device is in an abnormal condition when the shift control device is incapable of causing the automatic transmission to be forcedly shifted to the parking range.

15. A shift control device according to claim 14, wherein said control means causes the automatic transmission to be forcedly shifted to the neutral range when said judging means judges that said selected shift range and said current shift range differ from each other and when the associated vehicle is running at a speed equal to or lower than a predetermined value.

16. A shift control device according to claim 15, wherein said control means judges that the shift control device is in an abnormal condition when the shift control device is incapable of causing the automatic transmission to be forcedly shifted to the neutral range.

17. A shift control device according to claim 16, wherein said control means supplies the same actuation signal to said actuating means plural times until said judging means judges that said selected shift range and said current shift range are coincident with each other.

* * * * *